US009434617B2

(12) United States Patent
Kang et al.

(10) Patent No.: US 9,434,617 B2
(45) Date of Patent: Sep. 6, 2016

(54) CARBON NANOTUBES AND METHOD FOR MANUFACTURING THE SAME

(71) Applicant: LG CHEM, LTD., Seoul (KR)

(72) Inventors: Kyung Yeon Kang, Daejeon (KR); Jin Do Kim, Daejeon (KR); Sung Jin Kim, Daejeon (KR); Jae Keun Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/618,729

(22) Filed: Feb. 10, 2015

(65) Prior Publication Data

US 2015/0151970 A1 Jun. 4, 2015

Related U.S. Application Data

(63) Continuation of application No. 14/357,955, filed as application No. PCT/KR2013/000177 on Jan. 9, 2013, now Pat. No. 9,005,564.

(30) Foreign Application Priority Data

Jan. 11, 2012 (KR) .................. 10-2012-0003387
Jan. 7, 2013 (KR) .................. 10-2013-0001393

(51) Int. Cl.
*C01B 31/02* (2006.01)
*B01J 23/881* (2006.01)
(Continued)

(52) U.S. Cl.
CPC ............ *C01B 31/0233* (2013.01); *B01J 21/04* (2013.01); *B01J 23/755* (2013.01); *B01J 23/881* (2013.01);
(Continued)

(58) Field of Classification Search
CPC .............. C01B 31/0233; C01B 31/02; C01B 2202/36; C01B 2202/20; B01J 21/04; B01J 23/881; B01J 23/883; B01J 37/02; B01J 23/755; Y10S 977/843; Y10S 977/42; B82Y 30/00; B82Y 40/00
USPC ........ 423/447.1–447.3, 445 B; 977/742–754, 977/842–848
See application file for complete search history.

(56) References Cited

U.S. PATENT DOCUMENTS 5,707,916 A * 1/1998 Snyder .................. B01J 23/88
264/29.2
2001/0014307 A1 8/2001 Moy et al.
(Continued)

FOREIGN PATENT DOCUMENTS

CN 102196860 A 9/2011
EP 2746221 A1 6/2014
(Continued)

OTHER PUBLICATIONS

Seong Woo Jeong, Seong Yong Son, Dong Hyun Lee, "Synthesis of Multi-walled Carbon Nanotubes using Co—Fe—Mo/Al2O3 catalytic powders in fluidized bed reactor", Advanced Powder Technology 21, 2010, 93-99.
Liu, Y., et al., "Combined catalyst system for preferential growth of few-walled carbon nanotubes," Carbon, vol. 47, No. 10, Aug. 2009, pp. 2543-2546.

*Primary Examiner* — Daniel C McCracken
(74) *Attorney, Agent, or Firm* — Dentons US LLP

(57) ABSTRACT

Disclosed are carbon nanotubes and a method for manufacturing the same. Advantageously, the method provides a high yield of potato or sphere-shaped non-bundled carbon nanotubes having a bulk density of 80 to 250 kg/m$^3$, an ellipticity of 0.9 to 1.0 and a particle diameter distribution (Dcnt) of 0.5 to 1.0 using a two-component carbon nanotube catalyst comprising a catalyst component and an active component.

11 Claims, 4 Drawing Sheets

(51) Int. Cl.
*B01J 21/04* (2006.01)
*B01J 23/755* (2006.01)
*B01J 23/883* (2006.01)
*B01J 37/02* (2006.01)
*B01J 37/08* (2006.01)
*B01J 31/04* (2006.01)
*B82Y 40/00* (2011.01)
*B82Y 30/00* (2011.01)

(52) U.S. Cl.
CPC .............. *B01J 23/883* (2013.01); *B01J 31/04* (2013.01); *B01J 37/02* (2013.01); *B01J 37/0203* (2013.01); *B01J 37/08* (2013.01); *C01B 31/02* (2013.01); *B01J 37/0236* (2013.01); *B82Y 30/00* (2013.01); *B82Y 40/00* (2013.01); *C01B 2202/20* (2013.01); *C01B 2202/36* (2013.01); *Y10S 977/742* (2013.01); *Y10S 977/843* (2013.01)

(56) References Cited

U.S. PATENT DOCUMENTS

2008/0176070 A1\* 7/2008 Kitazaki .................. B01J 23/88
428/367
2011/0104490 A1 5/2011 Kambara et al.

FOREIGN PATENT DOCUMENTS

| EP | 2803409 A1 | 11/2014 |
|----|------------|---------|
| JP | 2010-540220 | 12/2010 |
| JP | 2011525167 A | 9/2011 |
| KR | 10-0596677 | 7/2006 |
| KR | 10-2010-00042765 | 4/2010 |
| KR | 10-2010-00067048 | 6/2010 |
| KR | 10-1007183 | 1/2011 |
| KR | 10-2013-0081916 A | 7/2013 |
| KR | 10-2013-0081921 A | 7/2013 |
| WO | 2010007781 A1 | 1/2010 |
| WO | 2010047439 A1 | 4/2010 |

\* cited by examiner

CARBON NANOTUBES AND METHOD FOR MANUFACTURING THE SAME

This application is a continuation of, and claims priority to, U.S. patent application Ser. No. 14/357,955 filed May 13, 2014, which is a National Stage Entry of International Application No. PCT/KR2013/000177, filed Jan. 9, 2013, and claims the benefit of Korean Application No. 10-2012-0003387, filed on Jan. 11, 2012, and Korean Application No. 10-2013-0001393, filed on Jan. 7, 2013, all of which are hereby incorporated by reference in their entirety for all purposes as if fully set forth herein.

TECHNICAL FIELD

The present invention relates to carbon nanotubes and a method for manufacturing the same. More specifically, the present invention relates to potato or sphere-shaped non-bundled carbon nanotubes having a bulk density of 80 to 250 kg/m$^3$, an elasticity of 0.9 to 1.0 and a particle diameter distribution (Dcnt) of 0.5 to 1.0 which are manufactured at a high yield, and a method for manufacturing the same.

BACKGROUND ART

Carbon nanotubes (hereinafter, referred as to "CNTs") are understood to mean cylindrical carbon nanotubes having a diameter of 3 to 150 nm, preferably 3 to 100 nm, and a length of many times, i.e. at least 100 times the diameter. CNTs consist of aligned carbon atom layers and have different types of cores. CNTs are also called as carbon fibrils or hollow carbon fibers. CNTs are industrially essential in the production of composites because of the size and specific properties thereof and may be utilized in further applications including electrical applications and energy applications.

CNTs are generally manufactured by arc discharge, laser ablation, chemical vapor deposition or the like. However, arc discharge and laser ablation are disadvantageously not suited to mass-production and involve excessive preparation costs or laser purchase costs.

Furthermore, chemical vapor deposition has problems in that synthesis velocity is very low and synthesized CNT particles are extremely small in the case of using a gas-phase dispersion catalyst and there is a limit to bulk production of CNTs because space utilization inside a reactor is significantly reduced in the case of using a substrate-supported catalyst.

The catalytically active component of the catalyst generally has an oxide form, a partially or completely reduced form, or a hydroxide form and the catalyst may be a carbon nanotube catalyst, a co-precipitation catalyst or the like which is commonly used for the production of CNTs. Of these, the carbon nanotube catalyst is preferred because the carbon nanotube catalyst advantageously has a higher bulk density than a co-precipitation catalyst, reduces probability of generation of fine powder by attrition which may be generated during fluidization due to small-amount generation of fine powder of 10 microns or less unlike the co-precipitation catalyst, and enables stable operation of the reactor due to superior mechanical strength of the catalyst.

In addition, as a method for producing a carbon nanotube catalyst, an impregnation method including mixing an aqueous metal solution and a support, followed by coating and drying is suggested. In this case, the produced catalyst has a disadvantage of limited catalyst loading. In addition, heterogeneous distribution of the active component and the catalytic component greatly affects CNT growth yield and CNT diameter distribution, but a method for controlling the heterogeneous distribution has not been suggested to date.

In particular, in accordance with a conventional impregnation method, when carbon nanotubes are synthesized using a prepared supported catalyst, the yield is lower than 1,000% and is limited due to high load. In addition, the carbon nanotubes are a bundle type and thus have low bulk density, decreased reactive gas injection rate and thus reduced CNT productivity.

Accordingly, there is a need for research which is capable of synthesizing carbon nanotubes having a high bulk density at a high yield using a CNT catalyst.

DISCLOSURE

Technical Problem

Therefore, the present invention has been made in view of the above problems, and it is an object of the present invention to provide carbon nanotubes which exhibit improved yield and high density by solving a low carbon nanotube synthesis yield, which is a drawback associated with use of a conventional carbon nanotube catalyst and controlling both activity and a fine powder of the catalyst, and a method for manufacturing the same.

Technical Solution

In accordance with one aspect of the present invention, the above and other objects can be accomplished by the provision of carbon nanotubes obtained using a two-component carbon nanotube catalyst comprising a clear aqueous metal solution wherein an alumina support (Al$_2$O$_3$), a catalyst component, multicarboxylic acid and an active component are selected such that the number of moles (x) of the catalyst component and the number of moles (y) of the active component satisfy $34 \leq x \leq 46$, $2 \leq y \leq 9$ and $40 \leq x+y \leq 53$, based on 100 mol of the alumina support.

In accordance with another aspect of the present invention, provided is a method for manufacturing carbon nanotubes comprising sequentially mixing multicarboxylic acid and an aqueous catalytic component precursor solution with an aqueous active component precursor solution to prepare a clear aqueous metal solution and mixing the clear aqueous metal solution with an alumina support, vacuum drying the resulting mixture at 40 to 80° C. and then baking the mixture at 650 to 800° C. to obtain a carbon nanotube catalyst in which a catalytic component and an active component are impregnated in and coated on the surface and micropores of the alumina support, loading the carbon nanotube catalyst into a fluidized bed reactor and injecting at least one carbon source selected from C1-C4 saturated or unsaturated hydrocarbons, or the carbon source and a mixed gas of oxygen and nitrogen into the reactor at 500 to 900° C., and growing non-bundled and spherical carbon nanotubes on the surface of the catalyst from the carbon source.

Hereinafter, the present invention will be described in detail.

The present invention is characterized in that carbon nanotubes are produced using a two-component carbon nanotube catalyst comprising a clear aqueous metal solution wherein an alumina support (Al$_2$O$_3$), a catalyst component, multicarboxylic acid and an active component are selected such that the number of moles (x) of the catalyst component and the number of moles (y) of the active component satisfy $34 \leq x \leq 46$, $2 \leq y \leq 9$ and $40 \leq x+y \leq 53$, based on 100 mol of the alumina support.

The carbon nanotubes may for example potato or sphere-shaped non-bundled carbon nanotubes which have a bulk density of 80 to 250 kg/m$^3$, an ellipticity of 0.9 to 1.0 and a particle diameter distribution (Dcnt) of 0.5 to 1.0.

Specifically, the carbon nanotube catalyst of the present invention comprises an alumina support ($Al_2O_3$), a catalyst component, multicarboxylic acid and an active component wherein the catalyst component, the multicarboxylic acid and the active component are supplied to the alumina support in the form of a clear aqueous metal solution obtained by sequentially adding the multicarboxylic acid and the catalyst component to the active component.

The clear aqueous metal solution means a precipitate-free aqueous solution. The term "precipitate" means a dark yellow precipitate such as $Fe(MoO)_3\downarrow$ produced by reaction of $F^{3+}$ with $3MoO^-$ at room temperature, when an Fe precursor (iron nitrate) as a catalytic component is added to water and a Mo precursor (ammonium molybdate) as an active component is then added thereto.

In the present invention, multicarboxylic acid is used and an addition order thereof is controlled such that the multicarboxylic acid is added to an active component before a catalyst component is added, thereby advantageously inhibiting formation of precipitate, reducing an area of the precipitate which occupies the support surface and improving activity of the catalyst.

In particular, a concentration of the clear aqueous metal solution according to the present invention is preferably 0.1 to 0.4 g/ml or 0.1 to 0.3 g/ml in view of impregnation efficiency.

The catalytic component used in the present invention comprises at least one selected from Fe and Ni, is for example at least one selected from the group consisting of Fe salts, Fe oxides, Fe compounds, Ni salts, Ni oxides and Ni compounds and is, for example, nitride such as $Fe(NO_3)_2.6H_2O$, $Fe(NO_3)_2.9H_2O$ or $Ni(NO_3)_2.6H_2O$.

In addition, the active component used in the present invention is for example Mo, is for example a Mo salt, Mo oxide or a Mo compound and is for example nitride, such as $(NH_4)_6Mo_7O_{24}.4H_2O$, which may be dissolved in distilled water before use.

The multicarboxylic acid used in the present invention may comprise at least one selected from the group consisting of dicarboxylic acid, tricarboxylic acid and tetracarboxylic acid. A molar ratio of the multicarboxylic acid to the active component may be 0.2 to 0.5.

In addition, the number of moles (x) of the catalyst component and the number of moles (y) of the active component may be selected such that x and y satisfy $34 \leq x \leq 46$, $2 \leq y \leq 9$ and $40 \leq x+y \leq 53$, based on 100 mol of the alumina support, in another example, the number of moles (x) of the catalyst component and the number of moles (y) of the active component may be selected such that x and y satisfy $36 \leq x \leq 46$, $4 \leq y \leq 9$ and $43 \leq x+y \leq 53$, based on 100 mol of the alumina support, and in another example, the number of moles (x) of the catalyst component and the number of moles (y) of the active component may be selected such that x and y satisfy $38 \leq x \leq 44$, $45 \leq y \leq 9$ and $46 \leq x+y \leq 48$, based on 100 mol of the alumina support.

Furthermore, the bulk density is defined by the following Equation 1, and a fine powder amount of the two-component carbon nanotube catalyst is small and a density distribution of carbon nanotubes grown therefrom also has a specific scope of the present invention.

Bulk density=CNT weight (kg)/CNT volume ($m^3$) [Equation 1]

The ellipticity and the non-bundle type can be achieved only by a specific process of preparing the two-component carbon nanotube catalyst suggested by the present invention (see FIG. 2). Specifically, the ellipticity is defined by the following Equation 2.

Ellipticity=the shortest diameter passing through center of CNT/the longest diameter passing through center of CNT. [Equation 2]

Furthermore, the particle diameter distribution (Dcnt) is defined by the following Equation 3 and also has a specific scope of the present invention, as demonstrated by Example given later.

$Dcnt=[Dn90-Dn10]/Dn50$ [Equation 3]

wherein Dn90 is a number average particle diameter which is measured based on 90% in an absorption mode using a Microtrac particle diameter analyzer after CNTs are immersed in distilled water and then allowed to stand for 3 hours, Dn10 is a number average particle diameter measured based on 10% under the same conditions, and Dn50 is a number average particle diameter measured based on 50% under the same conditions.

In addition, the carbon nanotubes have a particle diameter or an average particle diameter of 100 to 800 μm and a strand diameter of the carbon nanotubes is 10 to 50 nm.

In a specific example, according to the method for preparing a carbon nanotube catalyst, the carbon nanotube catalyst may be obtained as a support catalyst, in which a catalytic component and an active component are impregnated in and coated on the surface and micropores of the alumina support, manufactured by mixing a clear aqueous metal solution obtained by sequentially mixing multicarboxylic acid and an aqueous catalytic component precursor solution with an aqueous active component precursor solution with an alumina support, and vacuum drying and baking the resulting mixture.

In particular, an active component is first added before addition of a catalyst component to water, multicarboxylic acid is then added, and the catalyst component is then added. A concentration of the obtained clear aqueous metal solution is preferably 0.1 to 0.4 g/ml, more preferably 0.1 to 0.3 g/ml in view of reactivity.

The vacuum drying is carried out by rotary evaporation under vacuum at a temperature of 40 to 80° C. for 30 minutes to 3 hours and the baking is then carried out at 650 to 800° C. Baking time is 30 minutes to 5 hours, but the present invention is not limited thereto.

In particular, the mixture is preferably aged at 40 to 80° C. by rotating or stirring for one minute to five hours before the vacuum drying.

Furthermore, the mixture may be pre-baked at 250 to 400° C. after vacuum drying and before baking. Specifically, it is preferable in view of reaction efficiency that 50% at maximum of the total amount of the aqueous metal solution is impregnated in an alumina support immediately before the pre-baking and the residue of the aqueous metal solution is impregnated in the alumina support immediately after or immediately before the baking.

The carbon nanotube catalyst has a potato or spherical shape having a particle diameter or an average particle diameter measured before baking, of 30 to 150 μm and a surface particle diameter measured by SEM of 10 to 50 nm, but the present invention is not limited thereto. The bulk shape of the produced carbon nanotubes and the bulk shape of the catalyst depend on bulk shape of the used alumina support.

The carbon nanotube catalyst obtained by the method has a potato or spherical shape and has a structure in which the catalytic component and the active components (Fe, Co and Mo components) permeate the surface and micropores of the alumina support and are deeply coated as a monolayer or multilayer (two layers, or three or more layers) structure in the alumina.

The carbon nanotube catalyst obtained by the method has a spherical or potato shape and has a structure in which the catalytic component and the active components (Fe, Co and Mo components) permeate the surface and micropores of the alumina support and are deeply coated as a monolayer or multilayer structure in the alumina.

Assuming that a particle having a particle diameter of 32 μm or less, based on average particle diameter, is defined as an ultrasonic fine powder, while taking into consideration particle diameter or average particle diameter range (32-95 μm) range of the alumina support, the supported catalyst wherein the Fe, Co and Mo components are coated on the surface of the alumina support has a measured number average particle diameter value, of 10% or less or 5% or less.

For reference, the ultrasonic fine powder is an aggregate of a catalyst substance and an active substance adhered to a catalyst and, which passes through a sieve, but is fundamentally different from a catalytically active substance well coated on the support in view of particle diameter and catalytic activity. The ultrasonic fine powder is an island-type aggregate adhered to the catalyst, which causes a considerably low CNT yield. Such a substance is slightly weakly adhered to the catalyst and is thus detached therefrom upon ultrasonication, thus causing production of fine powder.

As herein used, the ultrasonic fine powder amount means an amount of a fine powder of a number average particle diameter measured through a particle diameter analyzer after ultrasonication for one minute and the support is intended to include a multilayer support.

In particular, the carbon nanotube catalyst obtained by the present invention preferably has a spherical shape in consideration of specific surface area. As can be seen from an SEM image of FIG. 1, the carbon nanotube-supported catalyst produced in accordance with the present invention also has a completely spherical shape and has a shape with a considerably high pore density.

Preferably, the carbon nanotube-supported catalyst according to the present invention has a particle diameter or an average particle diameter of 30 to 150 μm and a surface particle diameter measured by SEM, of 10 to 50 nm, in consideration of control of CNT diameter and catalyst activity.

Carbon nanotubes are produced from the carbon nanotube catalyst obtained by the method in accordance with the following procedure: loading the carbon nanotube catalyst into a fluidized bed reactor and injecting a carbon source or the carbon source and a mixed gas of oxygen and nitrogen into the reactor at a temperature of 500 to 900° C.; and growing non-bundled and spherical carbon nanotubes on the surface of the catalyst by decomposition of the carbon source.

According to the present invention, carbon nanotubes are manufactured at a yield of 1,000% or higher or 2,000% or higher, as can be demonstrated in Example given later.

That is, the carbon nanotube obtained by the present invention has a spherical bulk shape (see FIG. 2) and a high bulk density of 80 to 250 kg/m$^3$, thus having advantages associated with handling of CNTs in view of CNT scattering, packaging or the like.

The carbon nanotubes according to the present invention may be used as a raw material for electrical, electronic, energy fields and the like. In addition, the carbon nanotubes may be used as a reinforcing agent in plastics.

Effects of the Invention

As apparent from the fore-going, in accordance with the present invention, CNTs having a non-bundled spherical shape can be synthesized at a high yield by solving drawbacks of conventional impregnation methods for manufacturing CNTs, namely, the difficulty in improving a yield of CNTs and controlling both activity and fine powder of the carbon nanotube catalyst.

DESCRIPTION OF DRAWINGS

The above and other objects, features and advantages of the present invention will become apparent from the following description of preferred embodiments given in conjunction with the accompanying drawings, in which.

BEST MODE

Figure 1:
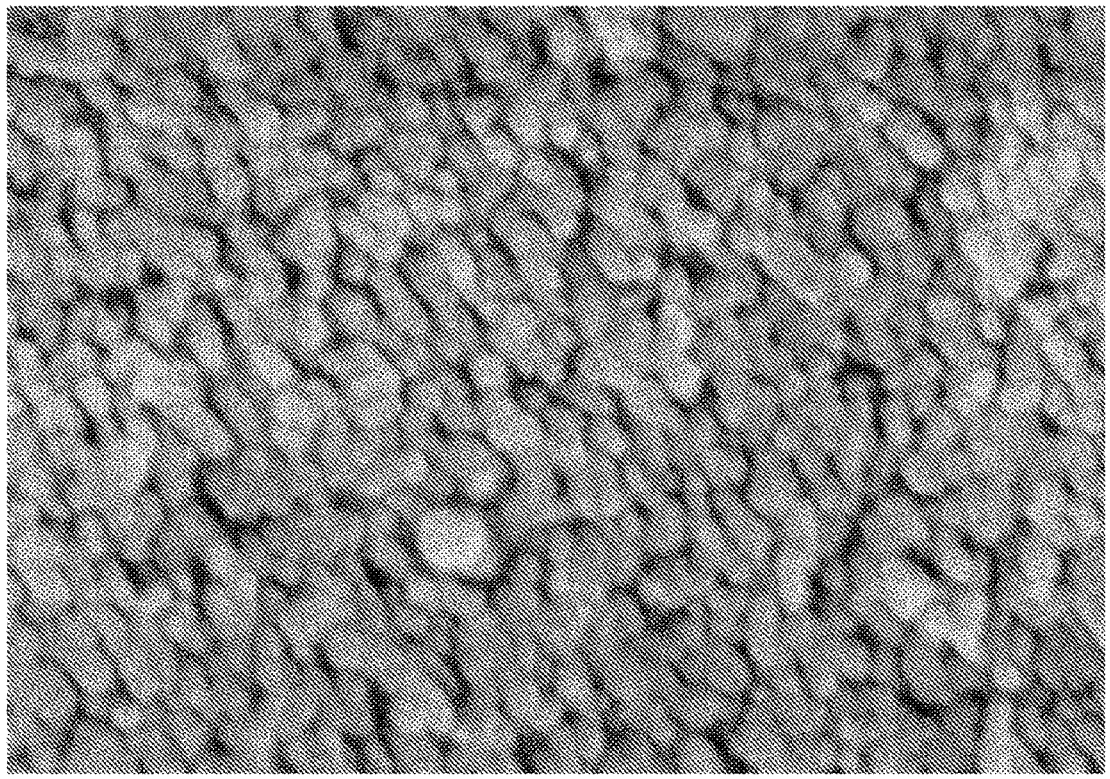
FIG. 1 is an SEM image (×100,000) of a catalyst in Example 1 according to the present invention.

Now, preferred examples will be provided for better understanding of the present invention. These examples are only provided to illustrate the present invention and should not be construed as limiting the scope and spirit of the present invention.

EXAMPLE

Example 1

Production 1 of CNT Catalyst

A. Preparation of Aqueous Metal Solution 0.298 mmol of $(NH_4)_6Mo_7O_{24} \cdot 4H_2O$ [2.085 mmol of Mo] was dissolved in 10 ml of water in a flask A, 0.758 mmol of citric acid was added to the flask A and 9.403 mmol of $Fe(NO_3)_2 \cdot 9H_2O$ was added thereto to prepare an aqueous metal solution.

The number of moles of Fe was 38.38, the number of moles of Mo was 8.51 and the number of moles of Fe+Mo was 46.89, when 24.5 mmol of used $Al_2O_3$ was converted to 100. The prepared aqueous metal solution was observed in the form of a clear precipitate-free solution even after 48 hours. Furthermore, the aqueous metal solution was maintained as the clear solution when stood for 30 days or longer.

In addition, because 7 mol of Mo was present per 1 mol of $(NH_4)_6Mo_7O_{24} \cdot 4H_2O$, the number of moles of the active component Mo was 2.085 mmol and a molar ratio of active component/multicarboxylic acid was 0.37.

B. Preparation of Support

In addition, a flask B containing 24.5 mmol of $Al_2O_3$ (D50v=80 micron, D50n=55 micron, pore volume: 0.64 cm$^3$/g, surface area: 237 m$^2$/g, product produced by Saint Gobain) was prepared. The $Al_2O_3$ has a nearly spherical bulk shape.

C. Preparation of Supported Catalyst from Aqueous Metal Solution and Support

The solution of the flask A was added to the flask B to sufficiently support a catalytically active metal precursor on $Al_2O_3$, followed by aging while stirring in a 60° C. thermostat for 5 minutes. The resulting solution was dried under vacuum at the temperature for 30 minutes. The dried catalyst was baked at 700° C. for three hours to prepare a homogeneous supported catalyst.

Figure 3:
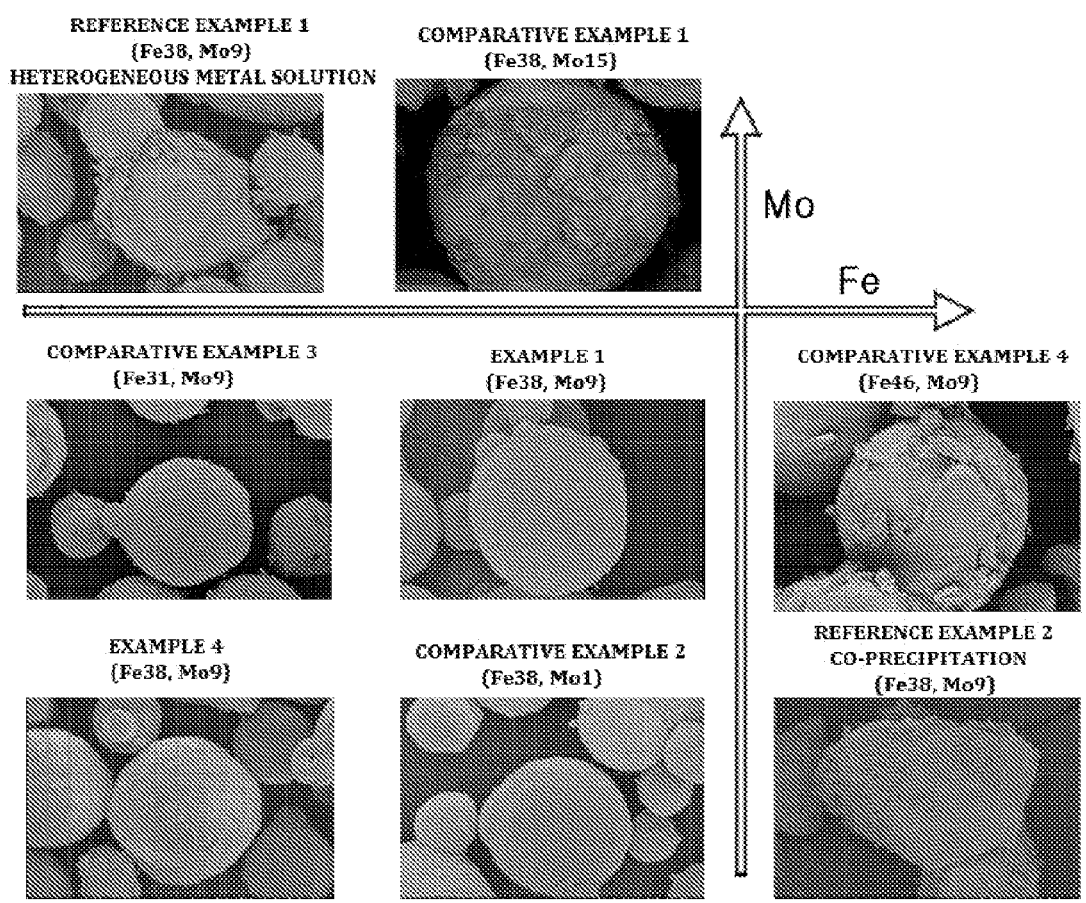
FIG. 3 is SEM images (×700, ×800, ×1000) showing catalysts obtained in Examples 1 to 3, Comparative Examples 1 to 4 and Reference Examples 1 to 2.
Figure 4:
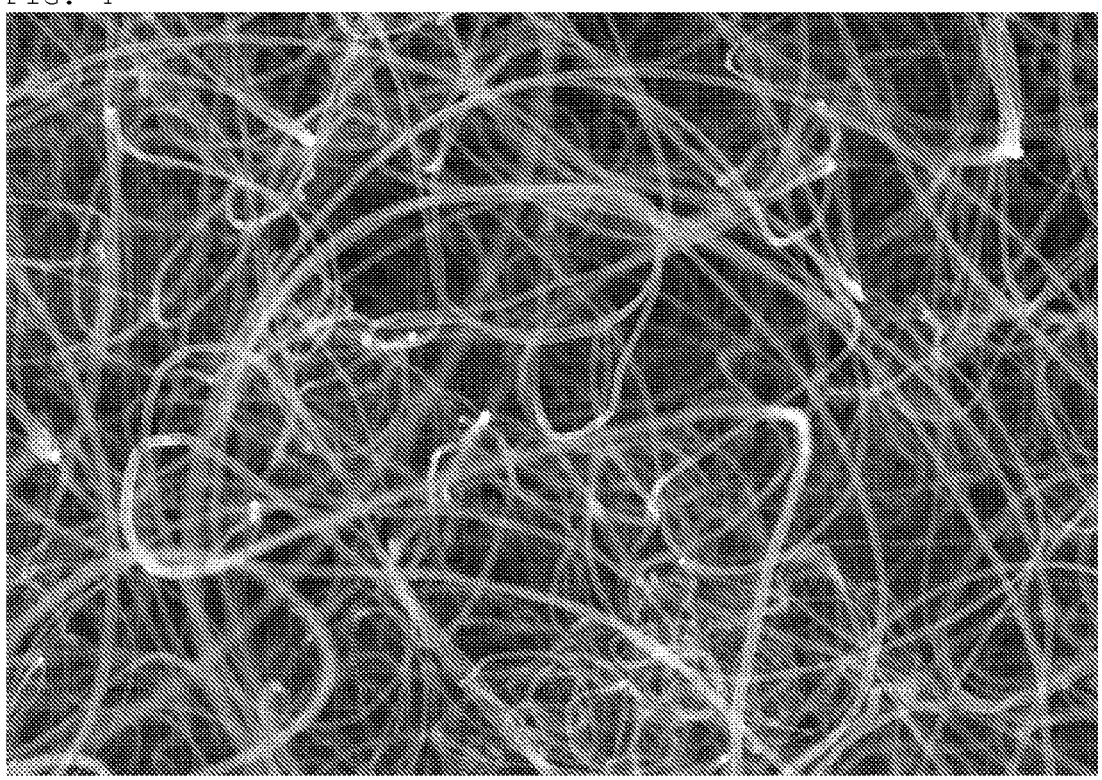
FIG. 4 is an SEM image (×50000) showing high-magnification CNTs of FIG. 1.

An SEM image of the catalyst thus produced corresponds to an image of Example 1 in FIG. 3.

An amount of ultrasonic fine powder finer than the particle diameter or the average particle lower limit (<32 μm) of the alumina support present on the catalyst was measured as 6%, on a basis of number average particle diameter.

In addition, the fine powder was dispersed in water and ultrasonic-shaken using a particle diameter analyzer (Microtrac, Bluewave) for one minute and a ratio of the number of fine powder having particles having a size of 32 μm or less was measured.

Example 2

Production 2 of CNT Catalyst

A catalyst was produced in the same process as in Example 1, except that 0.223 mmol of $(NH_4)_6Mo_7O_{24}.4H_2O$, 9.850 mmol of $Fe(NO_3)_2.9H_2O$, and 0.569 mmol of citric acid were used in A. Preparation of aqueous metal solution of Example 1.

That is, Fe was 40.21 mol, Mo was 6.38 mol and Fe+Mo was total 46.59 mol, based on 100 mol of $Al_2O_3$.

An SEM image of the catalyst thus produced corresponds to an image of Example 2 in FIG. 3.

An amount of ultrasonic fine powder finer than the particle diameter or the average particle lower limit (<32 μm) of the alumina support present on the catalyst corresponded to 4%, on a basis of number average particle diameter.

Example 3

Production 3 of CNT Catalyst

A catalyst was produced in the same process as in Example 1, except that 0.149 mmol of $(NH_4)_6Mo_7O_{24}.4H_2O$, 10.746 mmol of $Fe(NO_3)_2.9H_2O$ and 0.379 mmol of citric acid were used in A. Preparation of aqueous metal solution of Example 1.

That is, Fe was 43.86 mol, Mo was 4.25 mol and Fe+Mo was total 48.12 mol, based on 100 mol of $Al_2O_3$.

An SEM image of the catalyst thus produced corresponds to an image of Example 3 in FIG. 3.

An amount of ultrasonic fine powder finer than the particle diameter or the average particle lower limit (<32 μm) of the alumina support present on the catalyst corresponded to 0%, on a basis of number average particle diameter.

Example 4

Production 4 of CNT Catalyst

The same process as in Example 1 was repeated except that primary baking was performed at 350° C. for one hour using 50% of the solution of the flask A prepared in A. Preparation of aqueous metal solution and secondary baking was performed at 700° C. for three hours using the remaining solution during C. Preparation of supported catalyst from aqueous metal solution and support of Example 1. That is, Fe was 38.38 mol, Mo was 8.51 mol and Fe+Mo was total 46.89 mol, based on 100 mol of $Al_2O_3$.

An SEM image of the catalyst thus produced corresponds to an image of Example 4 in FIG. 3. An amount of ultrasonic fine powder finer than the particle diameter or the average particle lower limit (<32 μm) of the alumina support present on the catalyst corresponded to 0%, on a basis of number average particle diameter.

Comparative Example 1 Comparative Production 1 of CNT Catalyst

A catalyst was produced in the same process as in Example 1, except that 0.508 mmol of $(NH_4)_6O_7O_{24}.4H_2O$, 9.403 mmol of $Fe(NO_3)_2.9H_2O$ and 0.379 mmol of citric acid were used in A. Preparation of aqueous metal solution of Example 1.

That is, Fe was 38.38 mol, Mo was 14.52 mol and Fe+Mo was total 52.90 mol, based on 100 mol of $Al_2O_3$.

An SEM image of the catalyst thus produced corresponds to an image of Comparative Example 1 in FIG. 3. An amount of ultrasonic fine powder finer than the particle diameter or the average particle lower limit (<32 μm) of the alumina support present on the catalyst, corresponded to 58%, on a basis of number average particle diameter.

Comparative Example 2

Comparative Production 2 of CNT Catalyst

A catalyst was produced in the same process as in Example 1, except that 0.037 mmol of $(NH_4)_6Mo_7O_{24}.4H_2O$, 9.403 mmol of $Fe(NO_3)_2.9H_2O$, and 0.222 mmol of citric acid were used in A. Preparation of aqueous metal solution of Example 1. That is, Fe was 38.38 mol, Mo was 1.06 mol and Fe+Mo was total 39.44 mol, based on 100 mol of $Al_2O_3$.

An SEM image of the catalyst thus produced corresponds to an image of Comparative Example 2 in FIG. 3. An amount of ultrasonic fine powder finer than the particle diameter or the average particle lower limit (<32 μm) of the alumina support present on the catalyst corresponded to 0%, on a basis of number average particle diameter.

Comparative Example 3

Comparative Production 3 of CNT Catalyst

A catalyst was produced in the same process as in Example 1, except that 0.298 mmol of $(NH_4)_6Mo_7O_{24}.4H_2O$, 7.503 mmol of $Fe(NO_3)_2.9H_2O$, and 0.758 mmol of citric acid were used in A. Preparation of aqueous metal solution of Example 1.

That is, Fe was 30.62 mol, Mo was 8.51 mol and Fe+Mo was total 39.13 mol, based on 100 mol of $Al_2O_3$.

An SEM image of the catalyst thus produced corresponds to an image of Comparative Example 3 in FIG. 3. An amount of ultrasonic fine powder finer than the particle diameter or the average particle lower limit (<32 μm) of the alumina support present on the catalyst corresponded to 16%, on a basis of number average particle diameter.

Comparative Example 4

Comparative Production 4 of CNT Catalyst

A catalyst was produced in the same process as in Example 1 except that 0.298 mmol of $(NH_4)_6Mo_7O_{24}.4H_2O$, 11.302 mmol of Fe(NO$_3$)$_2$·9H$_2$O, and 0.758 mmol of citric acid were used in A. Preparation of aqueous metal solution of Example 1. That is, Fe was 46.13 mol, Mo was 8.51 mol and Fe+Mo was total 54.64 mol, based on 100 mol of Al$_2$O$_3$.

An SEM image of the catalyst thus produced corresponds to an image of Comparative Example 4 in FIG. 3. An amount of ultrasonic fine powder finer than the particle diameter or the average particle lower limit (<32 μm) of the alumina support present on the catalyst corresponded to 19%, on a basis of number average particle diameter.

Comparative Example 5

Comparative Production 5 of CNT Catalyst

The same process as in Example 1 was repeated except that 15 ml of water, 0.298 mmol of (NH$_4$)$_6$Mo$_7$O$_{24}$·4H$_2$O [Mo of 2.085 mmol], 0.758 mmol of citric acid and 9.403 mmol of Fe(NO$_3$)$_2$·9H$_2$O were significantly added to a flask A in A. Preparation of aqueous metal solution of Example 1.

Preparation of the catalyst suggested in Example 1 was impossible, because (NH$_4$)$_6$Mo$_7$O$_{24}$·4H$_2$O was not dissolved in the prepared aqueous metal solution.

CNT Production Example

Carbon nanotube synthesis was tested in a laboratory scale fixed bed reactor using catalysts for synthesizing CNTs produced in Examples 1 to 4.

Specifically, the catalyst for synthesizing CNTs produced in Example 1 was mounted in the middle of a quartz tube having an inner diameter of 55 mm, heated under a nitrogen atmosphere to 700° C. and allowed to stand and carbon nanotubes were synthesized for one hour while flowing 180 ml in total of nitrogen, hydrogen and an ethylene gas per minute at a predetermined volume mix ratio.

The synthesized carbon nanotubes were obtained at room temperature and content thereof was measured using an electronic scale. Reaction yield was calculated in accordance with the following equation based on weight of used catalyst for synthesizing CNTs and increment of weight of the catalyst after reaction.

CNT yield (%)=[total weight after reaction (g)− weight of used catalyst (g)]/weight of used catalyst (g)×100

Figure 2:
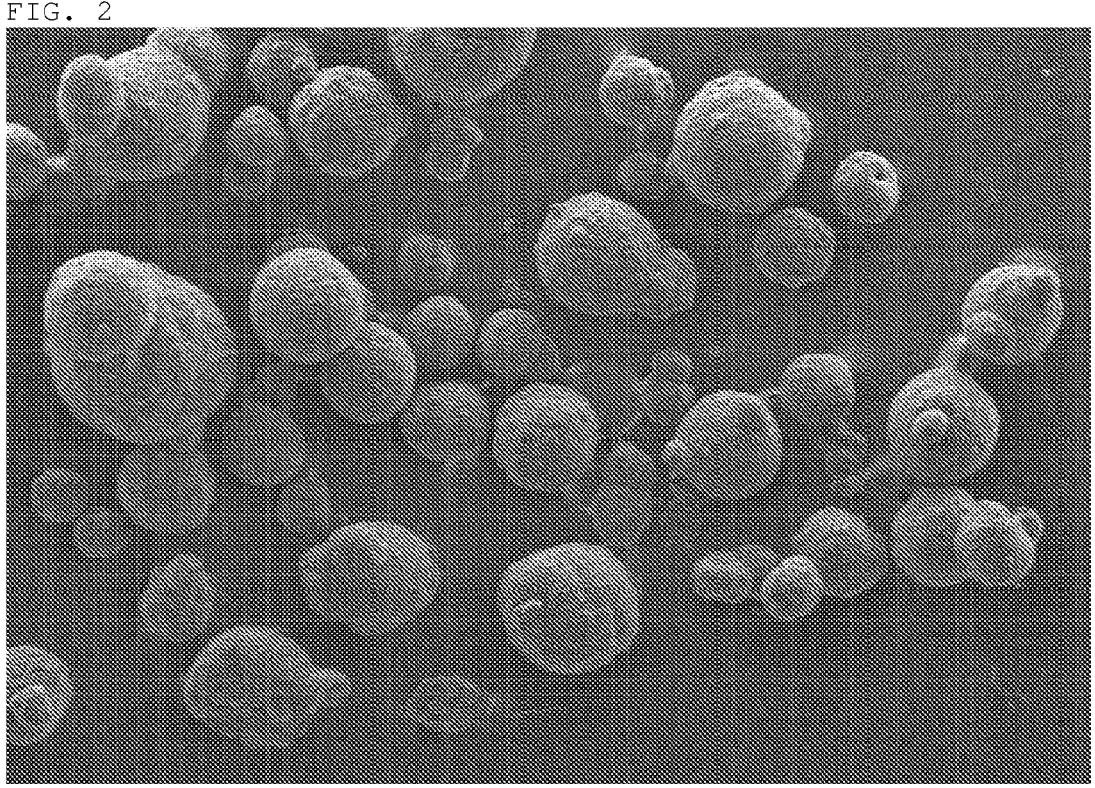
FIG. 2 is an SEM image (×30) showing CNTs synthesized using the catalyst of Example 1 according to the present invention.

CNTs collected in a CNT collector after reaction for one hour in Example 1 exhibited a CNT yield of 2266% with respect to amount of added catalyst and had a mean outer diameter of 20 nm. The produced CNTs have a spherical bulk shape, as shown in FIG. 2. It could be seen that a bulk density obtained by measuring a weight corresponding to a predetermined volume was 140 kg/m$^3$.

Results of Examples 2 to 4 are also summarized in the following Table 1. As can be seen from Table 1, yields measured in Examples 2 to 4 were 2131%, 1415% and 3172% and bulk densities were 160, 200 and 120 kg/m$^3$.

Furthermore, after the produced CNTs were dispersed in distilled water and allowed to stand for three hours, number average particle diameter of CNTs was measured in an absorbing mode using a Microtrac particle diameter analyzer, number average particle diameter Dn10 based on 10%, number average particle diameter Dn90 based on 90%, and number average particle diameter Dn50 based on 50% were obtained and particle diameter distribution Dcnt was represented by the following equation.

$Dcnt=[Dn90-Dn10]/Dn50$

CNT Production Comparative Example

CNT synthesis test was performed in the same manner as in CNT Production Example, except that catalysts of Comparative Examples 1 to 4 were used, instead of the catalyst of Example.

CNTs collected in a CNT collector after reaction for one hour in Comparative Example 1 exhibited a yield of 1,223% with respect to amount of added catalyst and a mean outer diameter of obtained CNTs was 20 nm. In addition, a measured bulk density was 210 kg/m$^3$.

In addition, results of Comparative Examples 2 to 4 are also summarized in the following Table 1. For reference, specimens of Examples 1 to 4 and Comparative Examples 1 to 4 had a volume average particle diameter of 300 to 600 μm and a particle diameter distribution of 200 to 500 μm.

TABLE 1

| Items | Fe (x)* | Mo (y)* | Fe + Mo (x + y) | Yield % | Properties of CNTs Shape | Dcnt | Bulk density (kg/m$^3$) | Non-treated specimen Number fine powder ratio (%) | Specimen upon ultrasonication for one minute Fine powder (%) < Dn 32 μm |
|---|---|---|---|---|---|---|---|---|---|
| Ex. 1 | 38 | 9 | 47 | 2266 | Spherical | 0.67 | 140 | 0 | 6 |
| Ex. 2 | 40 | 6 | 46 | 2131 | Spherical | 0.57 | 160 | 0 | 4 |
| Ex. 3 | 44 | 4 | 48 | 1415 | Spherical | 0.75 | 200 | 4 | 0 |
| Ex. 4 | 38 | 9 | 47 | 3172 | Spherical | 0.63 | 120 | 0 | 0 |
| Comp. Ex. 1 | 38 | 15 | 53 | 1223 | Spherical | 0.46 | 210 | 9 | 58 |
| Comp. Ex. 2 | 38 | 1 | 40 | 986 | Spherical | 0.48 | 250 | 0 | 0 |
| Comp. Ex. 3 | 31 | 9 | 40 | 1392 | Spherical | 0.41 | 230 | 7 | 16 |
| Comp. Ex. 4 | 46 | 9 | 55 | 2400 | Spherical | 1.32 | 120 | 7 | 19 |

*Number of moles based on 100 mol of Al$_2$O$_3$

As can be seen from Table above, Example 3 satisfying a specific molar ratio of Equation 1 exhibited a yield of CNTs synthesized using a prepared carbon nanotube catalyst, of 1,000% or more and had a bulk spherical shape and an ultrasonic fine powder amount measured based on number average particle diameter, of 10% or less.

In addition, Examples 1 to 2 satisfying a specific molar ratio of Equation 2 exhibited a yield of CNTs synthesized using a prepared carbon nanotube catalyst, of 2,000% or more and had a bulk spherical shape and an ultrasonic fine powder amount measured based on number average particle diameter, of 10% or less.

Furthermore, Example 4 wherein a multilayered catalyst was produced exhibited a yield of CNTs synthesized using the prepared carbon nanotube catalyst, of 3,000% or more and had a bulk spherical shape and an ultrasonic fine powder amount measured based on number average particle diameter, of 10% or less.

On the other hand, Comparative Example 1 wherein a Mo mol value was unsuitable exhibited a yield of CNTs synthesized using a prepared carbon nanotube catalyst, of 1,000% or more and had a bulk spherical shape, but had an ultrasonic fine powder amount measured based on number average particle diameter, greater than 10%.

Comparative Example 2 wherein a Mo mol value was unsuitable had a bulk spherical shape and an ultrasonic fine powder amount measured based on number average particle diameter, of 10% or less, but exhibited a yield of CNTs synthesized using a prepared carbon nanotube catalyst, of less than 1,000%.

Comparative Example 3 wherein an Fe mol value was unsuitable exhibited a yield of CNTs synthesized using a prepared carbon nanotube catalyst, of 1,000% or more and had a bulk spherical shape, but had an ultrasonic fine powder amount measured based on number average particle diameter, greater than 10%.

Comparative Example 4 wherein Fe and Mo mol values were unsuitable exhibited a yield of CNTs synthesized using a prepared carbon nanotube catalyst, of 1,000% or more and a bulk spherical shape, but had an ultrasonic fine powder amount measured based on number average particle diameter, greater than 10%.

The increase in contents of Fe and Mo causes an increase in yield of CNTs produced using a carbon nanotube catalyst and a problem of difficulty of homogeneous support due to high amount of metal support. Accordingly, maximum support amounts of Fe and Mo need to be limited in order to solve these problems.

In addition, all the CNTs produced from the carbon nanotube catalyst had a spherical bulk shape and a bulk density range of 80 to 250 kg/m$^3$.

Furthermore, regarding Dcnt, Examples 1 to 4 according to the present invention had Dcnt of 0.57 to 0.75, while Comparative Examples 1 to 4 had Dcnt of lower than 0.46 or Dcnt of higher than 1.32.

Reference Example 1

The same process as in Example 1 was repeated except that in A. Preparation of aqueous metal solution in Example 1, addition order of Fe, MoO and CA was changed to the order of Fe→MoO→CA.

A precipitate was formed in the prepared aqueous metal solution, but a catalyst was prepared in the same manner as in Example 1 using the aqueous metal solution.

An SEM image of the catalyst thus produced corresponds to an image of Reference Example 1 in FIG. 3.

An amount of ultrasonic fine powder finer than the particle diameter or the average particle lower limit (<32 μm) of the alumina support present on the catalyst corresponded to 22%, on a basis of number average particle diameter.

CNTs collected in a CNT collector after reaction for one hour exhibited a CNT yield of 860% with respect to amount of added catalyst. The produced CNT had a spherical bulk shape and had a bulk density obtained by measuring a weight corresponding to a predetermined volume, of 240 kg/m$^3$.

Furthermore, after the produced CNTs were dispersed in distilled water and allowed to stand for three hours, number average particle diameter of CNTs was measured in an absorbing mode using a Microtrac particle diameter analyzer, number average particle diameter Dn10 based on 10%, number average particle diameter Dn90 based on 90%, and number average particle diameter Dn50 based on 50% were obtained, and particle diameter distribution Dcnt in accordance with the following Equation was 0.91.

$$Dcnt=[Dn90-Dn10]/Dn50$$

In addition, the specimens had a volume average particle diameter of 300 to 600 μm and a particle diameter distribution of 200 to 500 μm.

Reference Example 2

Reference Example 2 of CNT Catalyst:
Co-Precipitation Method

A co-precipitated supported catalyst was prepared in the same manner as in Example 1, except that 49 mmol of Al(NO$_3$)$_3$.9H$_2$O, as a support, instead of Al$_2$O$_3$, and 1.84 mmol of NH$_4$HCO$_3$ as a co-precipitation agent were used.

An SEM image of the catalyst thus produced corresponds to an image of Reference Example 2 in FIG. 3. An amount of ultrasonic fine powder finer than the particle diameter or the average particle lower limit (<32 μm) of the alumina support present on the catalyst corresponded to 88%, on a basis of number average particle diameter.

CNTs collected in a CNT collector after reaction for one hour exhibited a CNT yield of 949% with respect to amount of added catalyst. The produced CNTs had an amorphous bulk shape and had a bulk density obtained by measuring a weight corresponding to a predetermined volume, of 45 kg/m$^3$.

Furthermore, after the produced CNTs were dispersed in distilled water and allowed to stand for three hours, number average particle diameter was measured in an absorbing mode using a Microtrac particle diameter analyzer, number average particle diameter Dn10 based on 10%, number average particle diameter Dn90 based on 90%, and number average particle diameter Dn50 based on 50% were obtained, and particle diameter distribution Dcnt in accordance with the following Equation was 2.52.

$$Dcnt=[Dn90-Dn10]/Dn50$$

In addition, the carbon nanotubes had a volume average particle diameter of 96 μm and a number particle diameter distribution of 43 μm.

CNTs synthesized using a co-precipitated catalyst prepared by a co-precipitation method exhibited a yield of 949%, which was considerably lower than that of Example 1 wherein the same mix ratio was used and a considerably high ultrasonic fine powder measured based on number average particle diameter, of 88%.

In addition, all of CNTs synthesized using the carbon nanotube catalyst had a spherical bulk shape and a bulk density ranging from 80 to 250 kg/m$^3$, while CNTs synthesized using the co-precipitated catalyst had an amorphous bulk shape and a low bulk density of lower than 80 kg/m$^3$.

Furthermore, in view of Dcnt, Examples 1 to 4 according to the present invention had a Dcnt of 0.57 to 0.75, while Reference Example 2 using a co-precipitation method had Dcnt higher than 2.52.

What is claimed is:

1. Carbon nanotubes comprising:
   a two-component carbon nanotube catalyst,
   wherein a bulk density of the carbon nanotubes is in a range of 80 to 250 kg/m$^3$,
   wherein the two-component carbon nanotube catalyst comprises an alumina support ($Al_2O_3$), a catalyst component, multicarboxylic acid and an active component,
   wherein the number of moles (x) of the catalyst component and the number of moles (y) of the active component satisfy $34 \leq x \leq 46$, $2 \leq y \leq 9$ and $40 \leq x+y \leq 53$, based on 100 mol of the alumina support, and
   wherein the two-component carbon nanotube catalyst is prepared by mixing a clear aqueous metal solution including the catalyst component, the active component and the multicarboxylic acid with the alumina support.

2. The carbon nanotubes according to claim 1, wherein the carbon nanotubes are potato or sphere-shaped non-bundled carbon nanotubes having an ellipticity of 0.9 to 1.0 and a particle diameter distribution (Dcnt) of 0.5 to 1.0.

3. The carbon nanotubes according to claim 1,
   wherein the clear aqueous metal solution has a concentration of 0.1 to 0.4 g/ml, obtained by sequentially adding the multicarboxylic acid and the catalyst component to the active component.

4. The carbon nanotubes according to claim 1, wherein the number of moles (x) of the catalyst component and the number of moles (y) of the active component satisfy $36 \leq x \leq 46$, $4 \leq y \leq 9$ and $43 \leq x+y \leq 53$, based on 100 mol of the alumina support.

5. The carbon nanotubes according to claim 1, wherein the catalyst component comprises at least one selected from Fe and Ni.

6. The carbon nanotubes according to claim 1, wherein the active component comprises Mo.

7. The carbon nanotubes according to claim 1, wherein the multicarboxylic acid comprises at least one selected from dicarboxylic acid, tricarboxylic acid and tetracarboxylic acid.

8. The carbon nanotubes according to claim 1, wherein a molar ratio of the multicarboxylic acid to the active component is 0.2 to 0.5.

9. The carbon nanotubes according to claim 1, wherein the two-component carbon nanotube catalyst has a structure in which the catalyst component and the active component are coated as a monolayer or a multilayer onto the surface and into micropores of the alumina support.

10. The carbon nanotubes according to claim 1, wherein the two-component carbon nanotube catalyst has an ultrasonic fine powder measured based on number average particle diameter, of 10% or less.

11. The carbon nanotubes according to claim 1, wherein the carbon nanotubes have a strand diameter of 10 to 50 nm.

* * * * *